(12) United States Patent
Kiuchi et al.

(10) Patent No.: US 10,410,418 B2
(45) Date of Patent: Sep. 10, 2019

(54) COMPUTER-READABLE NON-TRANSITORY STORAGE MEDIUM HAVING STORED THEREIN INFORMATION PROCESSING PROGRAM, INFORMATION PROCESSING SYSTEM, INFORMATION PROCESSING APPARATUS, AND INFORMATION PROCESSING METHOD FOR CONTROLLING MOVEMENT OF A VIRTUAL CAMERA IN A GAME SPACE

(71) Applicant: NINTENDO CO., LTD., Kyoto (JP)

(72) Inventors: Toshikazu Kiuchi, Kyoto (JP); Hiromasa Shikata, Kyoto (JP); Shiro Mouri, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 420 days.

(21) Appl. No.: 14/030,120

(22) Filed: Sep. 18, 2013

(65) Prior Publication Data

US 2014/0354687 A1    Dec. 4, 2014

(30) Foreign Application Priority Data

Jun. 3, 2013 (JP) .................. 2013-117070

(51) Int. Cl.
G06T 19/00 (2011.01)
A63F 13/40 (2014.01)

(52) U.S. Cl.
CPC .......... *G06T 19/006* (2013.01); *A63F 13/10* (2013.01); *A63F 2300/6684* (2013.01)

(58) Field of Classification Search
CPC ................................................. G06T 19/003
See application file for complete search history.

(56) References Cited

U.S. PATENT DOCUMENTS

| 6,409,597 | B1* | 6/2002 | Mizumoto | A63F 13/10 463/31 |
| 2005/0237323 | A1* | 10/2005 | Shimamura | A63F 13/10 345/419 |
| 2009/0058856 | A1* | 3/2009 | Kuroda | A63F 13/10 345/427 |
| 2010/0304858 | A1 | 12/2010 | Asuke et al. | |
| 2012/0307011 | A1* | 12/2012 | Shikata | A63F 13/5258 348/46 |

FOREIGN PATENT DOCUMENTS

| EP | 2 030 661 A2 | 3/2009 |
| JP | 2003334380 A * | 11/2003 |
| JP | 2010-273880 | 12/2010 |

OTHER PUBLICATIONS

Extended European Search Report (6 pgs.) dated Jul. 30, 2014 issued in corresponding European Application No. 13184106.6.
Unity: "Stealth game tutorial—301—Camera Movement—Unity Official Tutorials", Apr. 9, 2013, XP054975465, Retrieved from the Internet: URL: https://www.youtube.com/watch?v=JnRB_GDW6CU (1 pg.).

* cited by examiner

*Primary Examiner* — Stephen S Hong
*Assistant Examiner* — Richard M Russell
(74) *Attorney, Agent, or Firm* — Nixon & Vanderhye P.C.

(57) ABSTRACT

At least one determination coordinate is set near a virtual camera, and whether or not an obstacle object is present in a predetermined range in a direction based on a predetermined object from the determination coordinate, is determined. As a result, if the obstacle object is present, the virtual camera is moved so that the obstacle object will not be present in the predetermined range.

21 Claims, 10 Drawing Sheets

F I G. 5
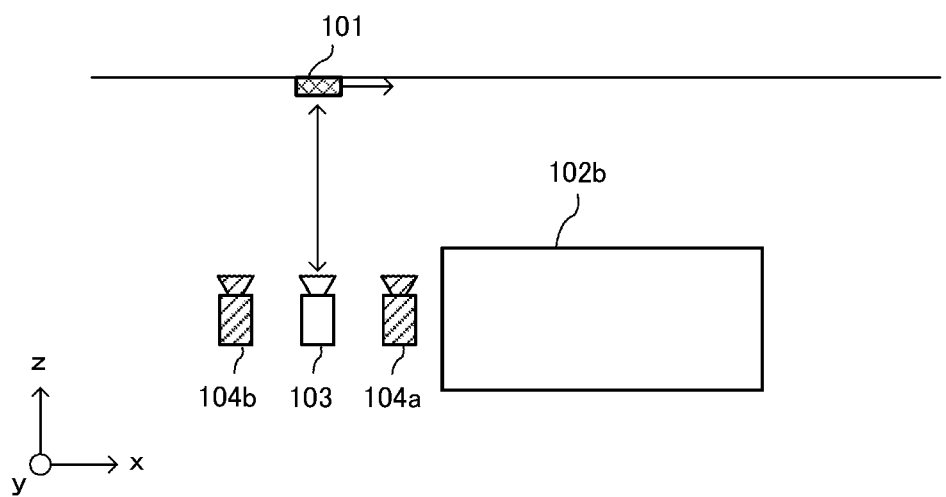
F I G. 6
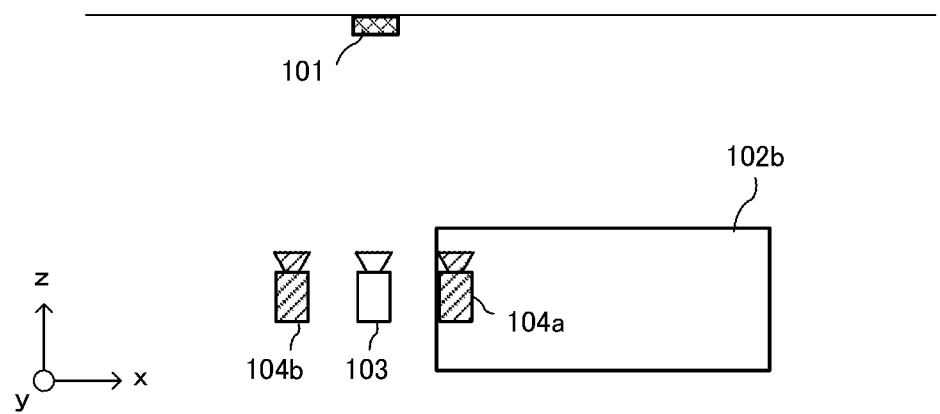

COMPUTER-READABLE NON-TRANSITORY STORAGE MEDIUM HAVING STORED THEREIN INFORMATION PROCESSING PROGRAM, INFORMATION PROCESSING SYSTEM, INFORMATION PROCESSING APPARATUS, AND INFORMATION PROCESSING METHOD FOR CONTROLLING MOVEMENT OF A VIRTUAL CAMERA IN A GAME SPACE

CROSS REFERENCE TO RELATED APPLICATION

The disclosure of Japanese Patent Application No. 2013-117070, filed on Jun. 3, 2013, is incorporated herein by reference.

FIELD

The exemplary embodiments relate to a computer-readable non-transitory storage medium having stored therein an information processing program to be executed by a computer of an information processing apparatus for displaying an image of a virtual 3-dimensional space taken by a virtual camera, and the like.

BACKGROUND AND SUMMARY

Conventionally, games are known in which an image of a 3-dimensional virtual game space taken by a virtual camera is presented as a game image. In addition, some of these games perform movement control for the virtual camera so as to display a game screen like a horizontal scroll game with horizontal vision or a vertical scroll game, for example.

In the case where the screen vision is for a horizontal scroll game with horizontal vision as described above and its game space is configured as a 3-dimensional space, basically, an image is taken such that a player character is viewed just forward from the virtual camera. The virtual camera moves in the horizontal direction so as to follow movement of the player character. For example, if the player character is moved rightward as seen from a player, the virtual camera also moves horizontally rightward as seen from the player. As a result, for example, a game image in which the player character is always positioned at the center of the game screen is displayed.

Here, in the case where the virtual camera is moved in the above manner, it will be assumed that there is an object (for example, wall object) as an obstacle in the movement direction of the virtual camera. FIG. 20 is a schematic diagram showing a virtual game space as seen from above, for explaining such a state. In the state shown in FIG. 20, if the player character moves rightward, along with this, the virtual camera also moves rightward so as to keep catching the player character from the front. As a result, as shown in FIG. 21, the virtual camera enters the inside of an obstacle object. As a result, the player character cannot be viewed from the virtual camera because the virtual camera's view is blocked by the obstacle object, and for example, the back surface of the obstacle object is displayed as a game image, which may cause a trouble to a player in playing the game.

In the above case, for example, it is conceivable to move the virtual camera instantaneously to a position outside the obstacle object at a timing when the virtual camera has entered the inside of the obstacle object. However, in this case, the screen is rapidly switched, thereby giving a feeling of strangeness to a player. Instead, it is also conceivable to gradually move the virtual camera to the outside of the obstacle object from the timing when the virtual camera has entered the inside of the obstacle object. However, also in this case, during several frames until the virtual camera moves to the outside after the virtual camera has entered the inside the obstacle object, a game image of the state in which the virtual camera is inside the obstacle object is presented to a player, and therefore the player is to feel strangeness and difficulty in viewing the screen.

Therefore, the exemplary embodiments will be described to provide an information processing program, an information processing system, an information processing apparatus, and an information processing method that are capable of, even when there is an obstacle or the like near a virtual camera, performing movement control of the virtual camera so as to provide an image of a virtual space without giving a feeling of strangeness to a player.

In order to achieve the above object, for example, the following configurations may be employed.

One example of such configurations is a computer-readable non-transitory storage medium having stored therein an information processing program which is executed by a computer of an information processing apparatus for displaying an image of a predetermined object in a virtual space taken by a virtual camera, and the information processing program causes the computer to function as: a determination coordinate setting section, an obstacle determination section, and a detouring section. The determination coordinate setting section sets at least one determination coordinate near the virtual camera. The obstacle determination section determines whether or not an obstacle object which is an object other than the predetermined object is present at least in a predetermined range in a direction based on the predetermined object from the determination coordinate. The detouring section, when the obstacle determination section has determined that the obstacle object is present, moves the virtual camera so that the obstacle object will not be present in the predetermined range.

According to the above configuration example, even if an obstacle or the like is present near a virtual camera for taking an image of a predetermined object such as a player character, a situation in which an image of the player character cannot be taken due to blocking by the obstacle is prevented.

In another configuration example, the information processing program may further cause the computer to function as a virtual camera movement control section configured to move the virtual camera, based on a predetermined condition. The virtual camera movement control section may move the virtual camera, based on operation data indicating the content of operation by a player. The virtual camera movement control section may move the virtual camera, based on movement of the predetermined object moved based on operation data indicating the content of operation by a player. A relative positional relationship between the predetermined object and the virtual camera may be a positional relationship defined in advance.

According to the above configuration example, when an obstacle is present in the movement destination of the virtual camera, the obstacle can be detected in advance and the virtual camera can be moved so as to detour around the obstacle. In addition, for example, in the case where the virtual camera is moved so as to follow a player character, a situation in which the player character cannot be viewed due to blocking by the obstacle is prevented.

In another configuration example, the determination coordinate setting section may set at least one said coordinate at a predetermined coordinate based on a travelling direction of the virtual camera. The determination coordinate setting section may further set said coordinate at a predetermined coordinate based on a direction opposite to the travelling direction of the virtual camera.

According to the above configuration example, for example, in information processing using control in which a movement route of a virtual camera can be predicted, an obstacle present in the travelling direction of the virtual camera can be detected in advance and avoided. In addition, also in the case where the travelling direction can be inversed in the control, an obstacle present in the inversed direction can be avoided.

In another configuration example, the information processing program may further cause the computer to function as a dummy camera placing section configured to place a dummy camera object at a position indicated by the determination coordinate, and the obstacle determination section may determine whether or not the obstacle object is present in an imaging direction of the dummy camera.

According to the above configuration example, even in the case where the virtual camera does not directly contact an obstacle but the obstacle enters the imaging range thereof so that a predetermined object will not be viewed, the virtual camera can detour around the object to take an image.

In another configuration example, the direction based on the predetermined object may be either one of a direction directed from the determination coordinate to the predetermined object and a direction directed from the virtual camera to the predetermined object. The obstacle determination section may determine whether or not the obstacle object is present in a range based on a distance from the virtual camera to the predetermined object.

According to the above configuration example, the presence of an obstacle can be detected in advance, whereby a situation in which imaging of a predetermined object by the virtual camera is blocked by the obstacle can be avoided.

In another configuration example, the obstacle determination section, as well as determining whether or not an obstacle object which is an object other than the predetermined object is present in a predetermined range in a direction based on the predetermined object from the determination coordinate, may further determine whether or not an obstacle object which is an object other than the predetermined object is present in a predetermined range in a direction based on the predetermined object from the position of the virtual object. The detouring section may move the virtual camera so that the obstacle object will not be present either in the predetermined range in the direction based on the predetermined object from the determination coordinate or in the predetermined range in the direction based on the predetermined object from the position of the virtual object.

According to the above configuration example, a situation in which imaging of a predetermined object is blocked by an obstacle entering the imaging range of the virtual camera can be avoided.

In another configuration example, the detouring section may move the virtual camera so that the obstacle object will not be present in the predetermined range, either by rotating the virtual camera around the predetermined object or by making the virtual camera approach the predetermined object.

According to the above configuration example, simple movement control for a virtual camera with a low processing load can be realized.

In another configuration example, the detouring section may gradually move the virtual camera so that the obstacle object will not be present in the predetermined range.

According to the above configuration example, an image presented to a player can be prevented from giving the player a feeling of strangeness due to rapid change.

According to the exemplary embodiments, an image of a virtual space that is easily viewable for a player can be provided.

BRIEF DESCRIPTION OF THE DRAWINGS

FIG. 5 is an exemplary diagram for explaining the summary of virtual camera control;

FIG. 6 is an exemplary diagram for explaining the summary of virtual camera control;

DETAILED DESCRIPTION OF NON-LIMITING EXAMPLE EMBODIMENTS

Hereinafter, one embodiment will be described.

Figure 1:
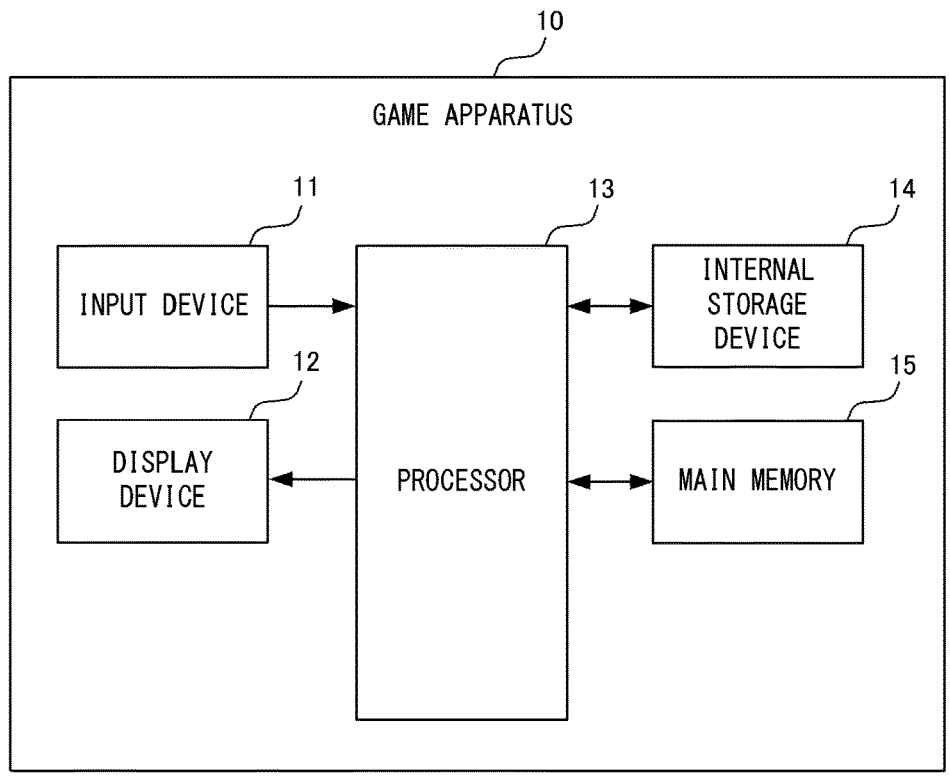
FIG. 1 is a block diagram showing an example of the configuration of a game apparatus 10.

In FIG. 1, a game apparatus 10 includes an input device 11, a display device 12, a processor 13, an internal storage device 14, and a main memory 15. The game apparatus 10 according to the present embodiment is assumed to be a hand-held game apparatus, for example. In another embodiment, the game apparatus 10 may be a stationary game apparatus. In still another embodiment, instead of a game apparatus, an information processing apparatus such as an image processing apparatus may be used.

The input device 11 is operated by a user of the game apparatus 10, and outputs a signal according to the user's operation. The input device 11 is, for example, a cross-shaped switch, a push button, or a touch panel. The display device 12 displays an image generated in the game apparatus 10, on a screen. The display device 12 is, for example, a liquid crystal display device. The internal storage device 14 has stored therein a computer program to be executed by the processor 13. Typically, the internal storage device 14 is a flash EEPROM. The main memory 15 temporarily stores a computer program or information.

Hereinafter, the summary of operation of processing executed on the game apparatus 10 according to the present embodiment will be described. The processing according to the present embodiment relates to control for a virtual camera in a virtual game space. The processing performs control such that when an obstacle is present at the movement destination of the virtual camera, the movement route of the virtual camera is adjusted so as to avoid (detour around) the obstacle.

Figure 2:
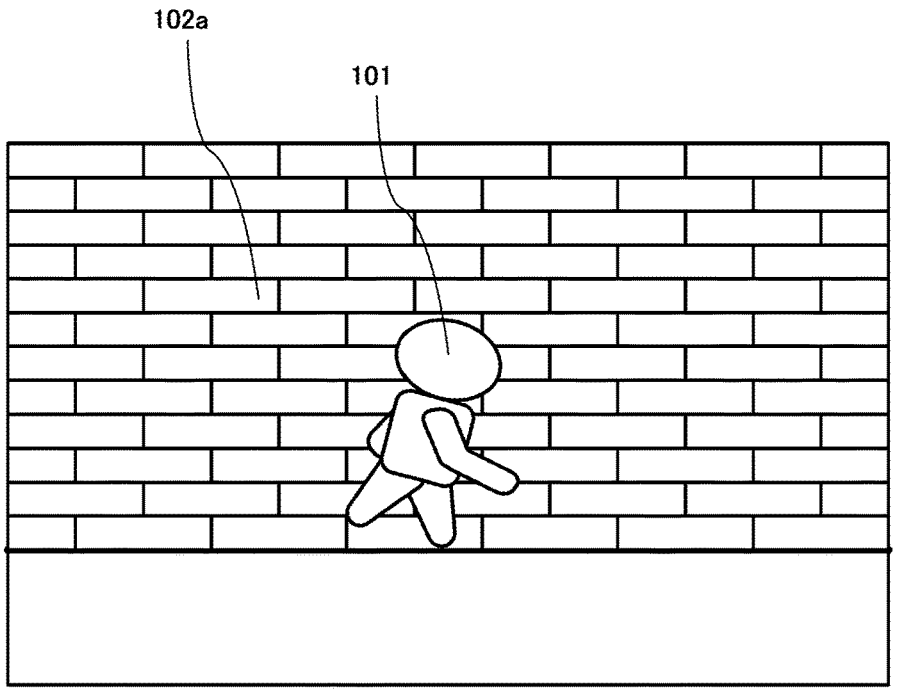
FIG. 2 is an example of a game screen assumed in the present embodiment.

First, the summary of a game assumed in the present embodiment will be described. Basically, this game has stages in a virtual 3-dimensional space. In addition, this game includes dungeons with maze-like structures, for example. A player can move a player character in such a dungeon, and this game includes a scene in which, at this time, if a predetermined condition is satisfied, the player character is moved along a wall of the dungeon. More specifically, the player character as a 3D model can be changed into a thin planar object, to become a state such as being pasted on the wall, thereby providing a scene in which the player character is moved along the wall. FIG. 2 is an example of a game screen in such a scene. In the screen example in FIG. 2, a player character 101 changed into a planar shape is moving rightward along the wall surface of a wall 102a.

Figure 3:
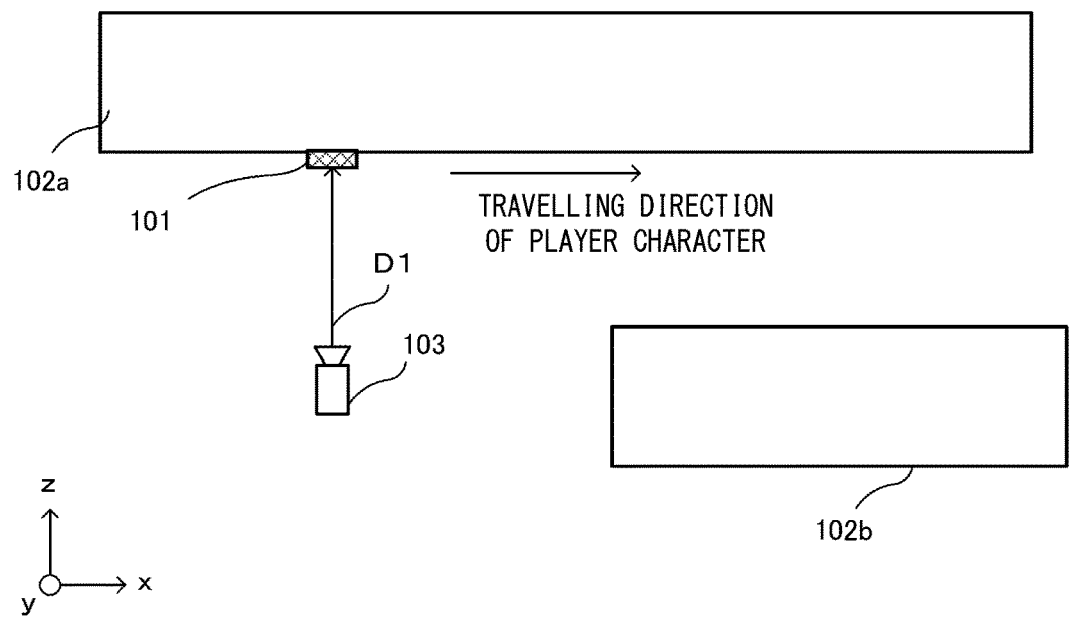
FIG. 3 is an exemplary diagram for explaining a reference positional relationship.
Figure 4:
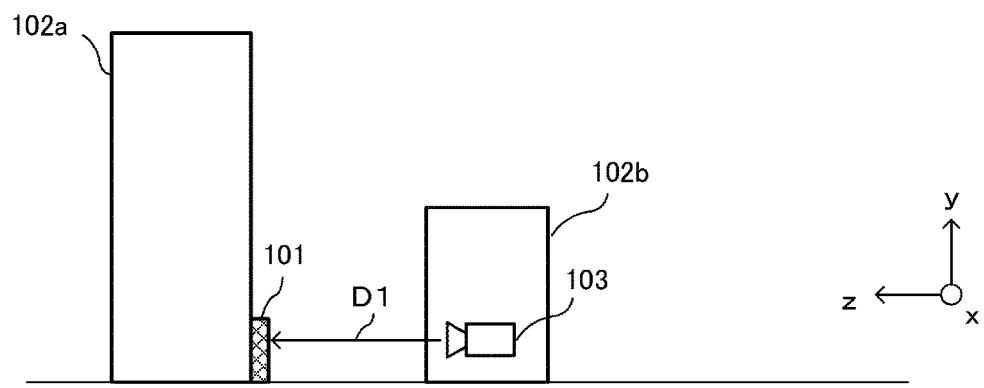
FIG. 4 is an exemplary diagram for explaining a reference positional relationship.

Here, the movement direction at this time is limited to right-left direction (as seen from a player). During such a movement along a wall, the positional relationship between the player character and the virtual camera is fixed in principle. Hereinafter, such a positional relationship between the player character and the virtual camera is referred to as a "reference positional relationship". FIGS. 3 and 4 are schematic diagrams showing an example of the reference positional relationship. FIG. 3 is a schematic diagram showing a virtual game space as seen from above, and FIG. 4 is a schematic diagram in the case where the travelling direction of the player character 101 coincides with the depth direction. In these figures, a virtual camera 103 is placed being spaced from the player character 101 by a distance D1 defined in advance (the gaze point is set at the player character 101) such that the entirety of the planar player character 101 is displayed, and the virtual camera 103 is positioned so as to face the front of the wall surface of the wall object 102a (hereinafter, simply referred to as a wall) on which the player character 101 is present. Therefore, the height (position in Y axis direction) where the virtual camera 103 is placed is slightly higher (almost the same height as the player character 101) than the ground. In addition, the direction (angle) of the virtual camera 103 is parallel to the ground (perpendicular to the wall surface). In the present embodiment, such a positional relationship between the player character 101 and the virtual camera (including the orientation of the virtual camera) is used as the reference positional relationship.

In addition, in the description below, a direction in which the player character 101 can travel is the right-left direction in FIG. 3, and the case of travelling rightward will be described as an example. In this case, along with movement of the player character 101, the virtual camera 103 also moves rightward in FIG. 3 while keeping the reference positional relationship in principle (in other word, if the travelling direction of the player character 101 is found, the movement destination and the movement route of the virtual camera 103 can be also estimated to a certain extent).

Next, under assumption of the above case, the principle of virtual camera control processing of the present embodiment will be described. FIGS. 5 to 11 are diagrams for explaining the principle of the virtual camera control. First, in the present embodiment, dummy cameras 104a and 104b (hereinafter, may be collectively referred to as dummy cameras 104) are placed near the virtual camera 103 on the left and the right thereof in FIG. 5 (with reference to the travelling direction of the player character, placed at positions in the travelling direction and the opposite direction). The directions (imaging directions) of the dummy cameras 104 are the same as the direction (imaging direction) of the virtual camera 103 (that is, the imaging direction of the virtual camera is directly used as those of the dummy cameras). In addition, the virtual camera 103 and the dummy cameras are spaced by a predetermined interval. It is noted that the dummy cameras 104, which are referred to as "dummy camera" here for convenience sake in description, are not used for taking an image of the virtual game space, but actually, the dummy cameras 104 are objects (invisible to a player) used for determining a position of the virtual camera 103 that allows avoidance of contact with an obstacle as described later. In another embodiment, the dummy cameras 104 may be treated not as an object but merely as coordinate information indicating their positions (for example, the coordinate corresponding to the midpoint between the dummy cameras 104).

Figure 7:
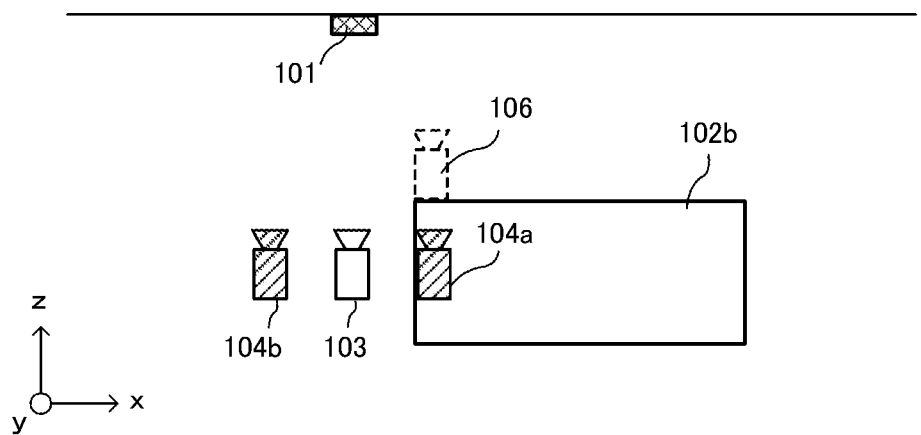
FIG. 7 is an exemplary diagram for explaining the summary of virtual camera control.

In the state shown in FIG. 5, if the player character 101 moves in the travelling direction (rightward in FIG. 5), along with this, the virtual camera 103 and the dummy cameras 104a and 104b placed on both sides of the virtual camera 103 also move along the travelling direction while keeping the reference positional relationship. As a result, as shown in FIG. 6, it will be assumed that the position of the dummy camera 104a has entered the inside of the wall 102b. In such a case, in the present embodiment, it is determined that the dummy camera 104 has entered the inside of the wall 102b (has contacted the wall 102b) as shown in FIG. 6, and at this timing, an avoidance position 106 shown in FIG. 7 is calculated. The avoidance position 106 is a position that, for example, if the virtual camera 103 is assumed to be present at the position of the dummy camera 104a on the x axis in FIG. 7, allows the virtual camera 103 to take an image of the player character 101 without being blocked by the wall 102b. In other words, the avoidance position 106 is a position that causes the wall 102b not to be included in the imaging range of the virtual camera 103. It is noted that in FIG. 7, for facilitating the description, the case where the entirety of the dummy camera 104 has entered the inside of the wall 102b is shown. However, in another embodiment, the avoidance position 106 may be calculated at a time when a part of the dummy camera 104 has contacted the wall 102b.

Figure 8:
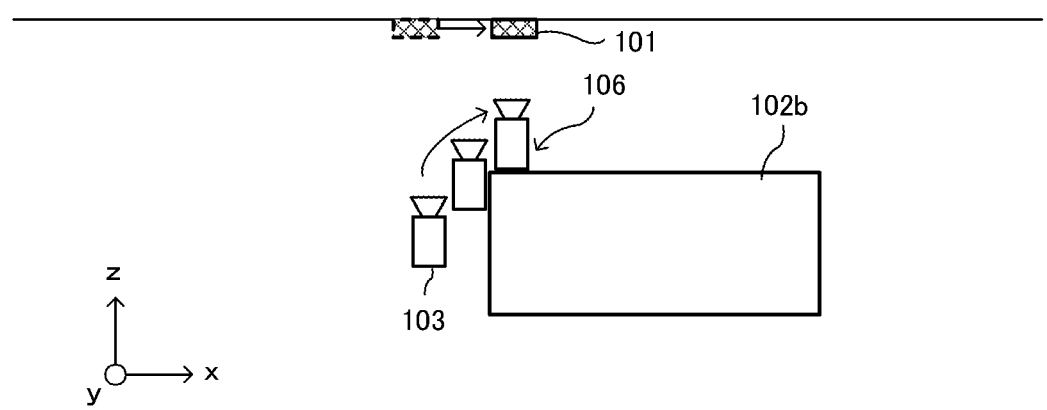
FIG. 8 is an exemplary diagram for explaining the summary of virtual camera control.
Figure 9:
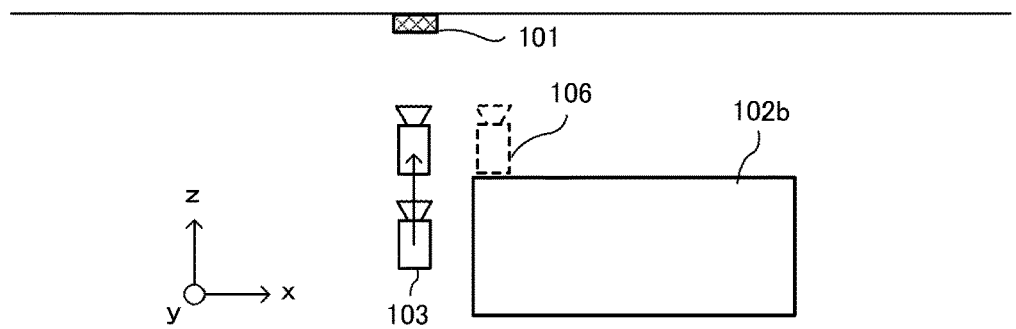
FIG. 9 is an exemplary diagram for explaining the summary of virtual camera control.
Figure 10:
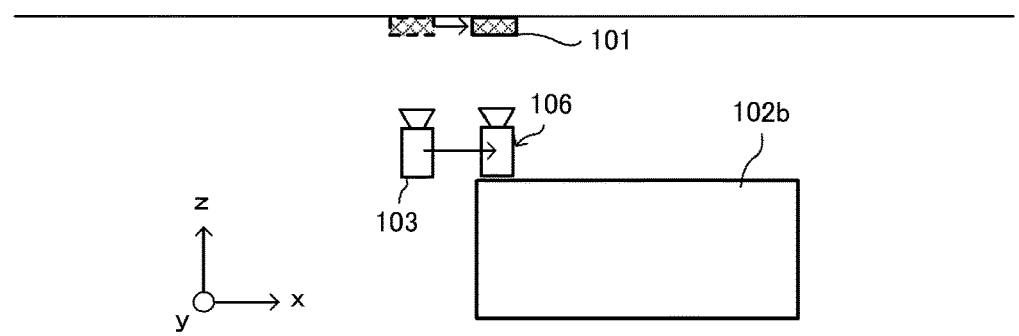
FIG. 10 is an exemplary diagram for explaining the summary of virtual camera control.

At a time when it is determined that the dummy camera 104a has entered the inside of the wall 102b, that is, at a stage before the virtual camera 103 enters the inside of the wall 102b, the position of the virtual camera 103 is moved to a position based on the avoidance position. In this example, the virtual camera 103 is moved so that the position on the z axis of the virtual camera 103 becomes equal to the position on the z axis of the avoidance position 106. For example, in the state in FIG. 6, if the player character 101 is moved at a constant speed in the travelling direction, movement in the x axis direction in FIG. 6 of the virtual camera 103 is controlled so as to follow the movement of the player character 101 (in other words, movement operation by a player), but movement in the z axis of the virtual camera 103 is controlled so that the position on the z axis of the virtual camera 103 gradually reaches the position on the z axis of the avoidance position 106, irrespective of a player's operation. As a result, as shown in FIG. 8, the virtual camera 103 is controlled to be gradually moved to the avoidance position 106 (consequently, the movement route detours around the wall 102*b*). In addition, for example, in the case where the player character 101 keeps its state (stationary) shown in FIG. 6 without moving therefrom, as shown in FIG. 9, the position in the x axis direction of the virtual camera 103 is kept directly in front of (directly facing to) the player character 101 and only the position in the z axis direction is controlled to gradually reach the position on the z axis of the avoidance position 106 as time elapses. Thereafter, if the player character 101 is moved in the travelling direction, along with this, the virtual camera 103 is also moved in parallel in the travelling direction, and as a result, as shown in FIG. 10, reaches the position represented by the avoidance position 106.

Figure 11:
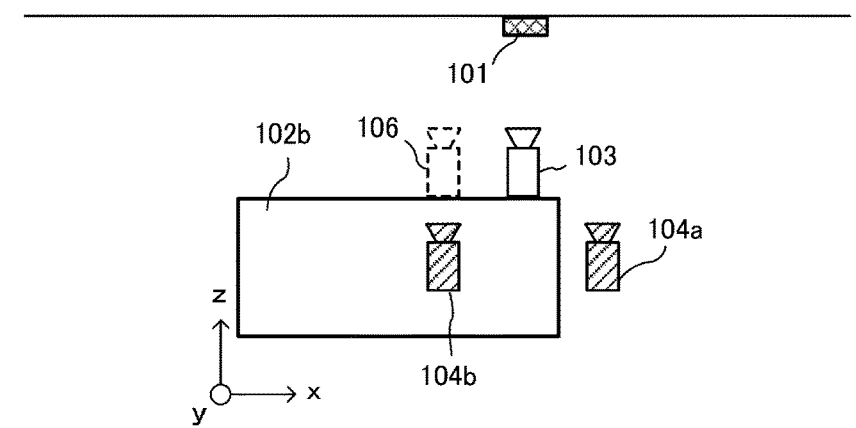
FIG. 11 is an exemplary diagram for explaining the summary of virtual camera control.

Then, it will be assumed that the player character 101 is further moved in the travelling direction so that the dummy camera 104*a* comes out of contact with the wall 102*b* as shown in FIG. 11. Even in this case, the dummy camera 104*b* is in contact with the wall 102*b*. Therefore, the avoidance position 106 for the dummy camera 104*b* is calculated and the position on the z axis of the virtual camera 103 is moved to the position on the z axis of the avoidance position 106. However, in the first place, in the state shown in FIG. 11, the position on the z axis of the virtual camera 103 has been already equal to the position on the z axis of the avoidance position 106. Therefore, consequently, the position on the z axis of the virtual camera 103 keeps its current position. Thereafter, when the dummy camera 104*b* also comes out of contact with the wall 102*b*, processing of gradually returning the positional relationship of the virtual camera 103 to the reference positional relationship is performed.

By the above control, when there is an obstacle near (typically, in the travelling direction) the virtual camera 103 moving along with movement of the player character 101, the virtual camera 103 can be moved so as to gradually detour around the obstacle. As a result, a game image with no strangeness can be provided to a player.

In the present embodiment, control for a virtual camera is performed on the above principle. An example of specific processing of such control is as described below. Although in the above description, the case where the dummy camera 104 enters the inside of an obstacle such as the wall 102 has been described as an example, actual processing determines whether or not an obstacle is present on the line of sight as seen forward from the dummy camera 104. That is, even if the dummy camera 104 does not contact a wall or the like, whether or not the player character 101 cannot be seen from the position of the dummy camera 104 as being blocked by some obstacle or the like in the case where the imaging direction thereof is assumed to be the same as that of the virtual camera 103, is determined. For example, a line (hereinafter, this line may be referred to as line of sight) extending in the imaging direction from the position of the dummy camera 104 is calculated. It is noted that the length of this line is compliant with the distance between the virtual camera 103 and the player character 101 in the reference positional relationship. Then, whether or not an obstacle that blocks imaging of the player character 101 is present on this line is determined (collision determination between the line and an obstacle), and thereby whether or not to calculate the avoidance position is determined. In another embodiment, instead of whether or not an obstacle is present on the line, whether or not an obstacle is present in an imaging range of the distance D1 from the position of the dummy camera 104 may be determined.

It is noted that in the description below, a state in which the line of sight of the dummy camera 104 is blocked by some obstacle may be referred to as a collision state, and a state in which the line of sight is not blocked may be referred to as a non-collision state. In addition, in the processing described later, the same collision determination as described above is also performed for the virtual camera 103. Therefore, in the description below, the terms "collision state" and "non-collision state" are used as collective terms including the collision state and the non-collision state of the virtual camera 103.

Figure 12:
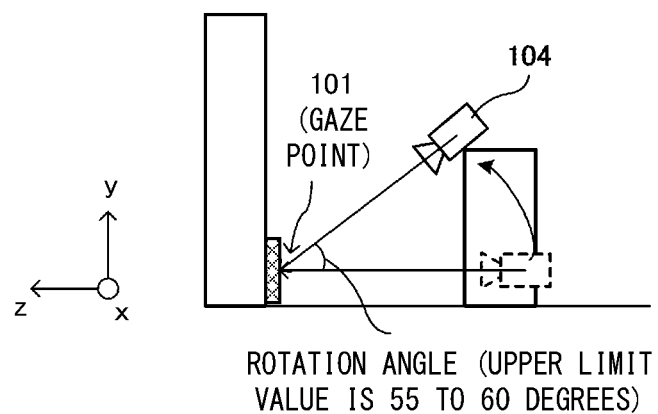
FIG. 12 is an exemplary diagram for explaining the summary of virtual camera control.

In the above description of the principle, regarding calculation of the avoidance position, an example in which the position is calculated so as to make the virtual camera 103 approach the player character 101 has been shown. In a processing example described later, as shown in FIG. 12, the avoidance position is obtained by rotating the virtual camera 103 around the gaze point with respect to the x axis sequentially at predetermined angle intervals. The direction of this rotation is the positive direction of the y axis. An upper limit value is set for the rotation angle, which is, for example, 55 to 60 degrees. If a position satisfying a condition for the avoidance position has been successfully calculated in this rotation process, the calculated position is used as the avoidance position. On the other hand, even after the virtual camera 103 is rotated up to the upper limit value, if the player character 101 is still blocked on the line of sight at this time, the virtual camera 103 is made to approach (pulled close to) the player character 101 (gaze point) sequentially at predetermined distance intervals, to further calculate the avoidance position. It is noted that an upper limit value is also set for the distance of this approaching.

Next, with reference to FIGS. 13 to 19, the operation of the game apparatus 10 according to the present embodiment will be described in more detail.

Figure 13:
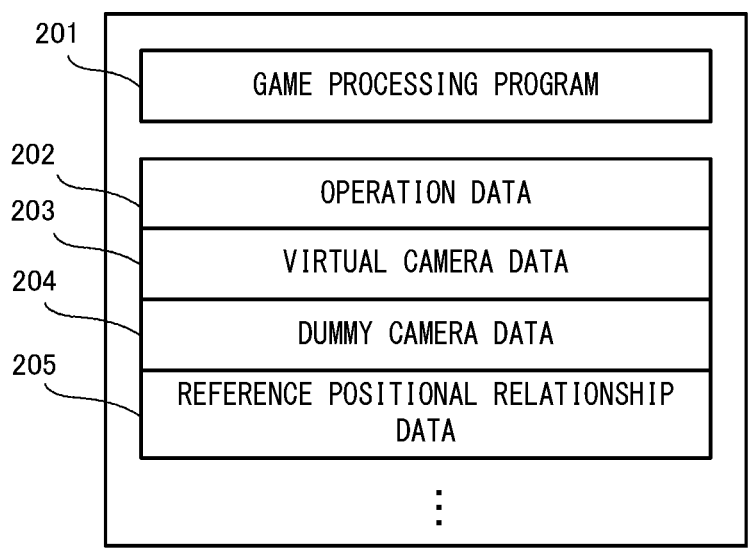
FIG. 13 is an example of information to be stored in a main memory 15 of the game apparatus 10.

FIG. 13 shows an example of a program and information to be stored in the main memory 15 of the game apparatus 10. The main memory 15 stores a game processing program 201, operation data 202, virtual camera data 203, dummy camera data 204, reference positional relationship data 205, and the like.

The game processing program 201 is a program for executing the game processing described above.

The operation data 202 is data indicating various operations performed for the game apparatus 10. For example, the operation data 202 includes button data indicating the press state of each button, and the like.

The virtual camera data 203 is data indicating the virtual camera 103, and includes data indicating a position thereof in a virtual game space, and the orientation, the imaging direction, the angle of view, and the like of the virtual camera. The dummy camera data 204 is data indicating the dummy camera 104, and includes data indicating the position thereof. It is noted that in the present embodiment, as described above, the dummy cameras 104 are placed near the virtual camera 103, one by one on the left and the right (front and back in the travelling direction) of the virtual camera 103 (therefore, the dummy camera data 204 includes data of the two dummy cameras 104a and 104b).

The reference positional relationship data 205 is data for indicating a relative positional relationship between the player character 101 and the virtual camera 103 in the "reference positional relationship" described above. In other words, the reference positional relationship data 205 is data defining the "reference positional relationship".

Next, with reference to the flowchart shown in FIG. 14, a flow of processing executed by the processor 13 of the game apparatus 10 will be described. It is noted that in the flowchart shown in FIG. 14, processing (virtual camera control processing) relevant to control for the virtual camera 103 as described above will be mainly described, and the detailed description of the other processing that is not directly relevant to the present embodiment is omitted. A processing loop composed of a series of steps S1 to S10 shown in FIG. 14 is repeatedly executed once every predetermined time (frame time).

Figure 14:
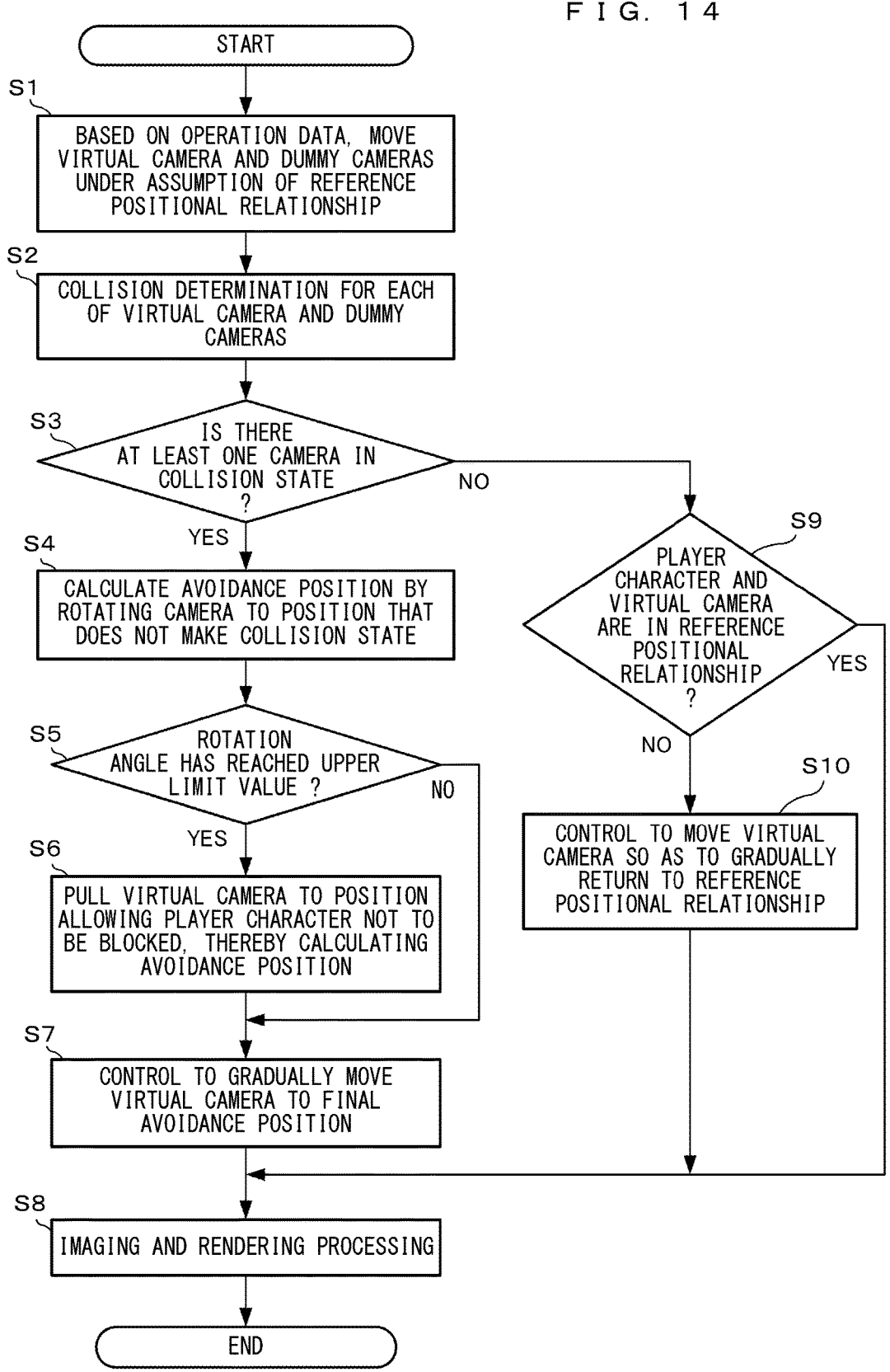
FIG. 14 is an exemplary flowchart showing the details of virtual camera control processing according to the present embodiment.

It is noted that each processing step in the flowchart shown in FIG. 14 is merely an example, and the order of steps may be changed as long as the same result is obtained. In addition, the values of variables and threshold values used in determination steps are also merely examples, and other values may be employed as necessary. In addition, in the present embodiment, the case where the processor 13 executes each processing step in the flowchart will be described. However, a processor other than the processor 13, or a dedicated circuit may execute some of the processing steps of the flowchart.

When game processing is started, initialization processing (not shown) is performed to generate a virtual game space, places the player character 101, and places the virtual camera 103 at a position based on the reference positional relationship. Further, the dummy cameras 104 are placed one by one at positions spaced from the virtual camera 103 by a predetermined interval on the left and the right of the virtual camera 103. Besides, various processes needed for starting the game processing are performed as appropriate. Thereafter, control processing for the virtual camera as described below will be repeatedly executed.

In FIG. 14, first, in step S1, the processor 13 acquires the operation data 202, and then moves the virtual camera 103 and the dummy cameras 104 based on the operation data 202. Here, this movement is under the assumption of the reference positional relationship. That is, this movement is parallel to movement of the player character 101, and the positions in the height direction (in FIG. 12, the y axis direction) of the virtual camera 103 and the dummy cameras 104 are not changed at this time. If the operation data 202 indicates that the player character 101 is not moved (that is, stationary state), the virtual camera 103 and the dummy cameras 104 are not moved in the processing of this step.

Next, in step S2, the processor 13 determines whether or not each of the virtual camera 103 and the dummy cameras 104 (under the assumption of the reference positional relationship) is in a collision state as described above. In subsequent step S3, based on a result of step S2, the processor 13 determines whether or not at least one camera in a collision state is present among the virtual camera 103 and the dummy cameras 104. As a result, if there is no camera in a collision state among the virtual camera 103 and the dummy cameras 104 (NO in step S3), the process proceeds to step S9 described later.

On the other hand, if there is at least one camera in a collision state among the virtual camera 103 and the dummy cameras 104 (YES in step S3), it is considered that the position of the virtual camera 103 needs to be adjusted so as not to contact an obstacle. In this case, in step S4, the processor 13 calculates a position where the virtual camera 103 will not be in a collision state, that is, the avoidance position (see FIG. 12). Here, regarding the calculation of the avoidance position, if a plurality of cameras in a collision state are present among the virtual camera 103 and the dummy cameras 104, the avoidance position is calculated (searched for) while each of such cameras is gradually rotated around the gaze point as shown in FIG. 12. Then, as a result, the highest one of such positions calculated for the virtual camera 103 and the dummy cameras 104 is employed as the avoidance position. As described above, an upper limit value is defined in advance for the rotation angle. Therefore, if the rotation angle has reached the upper limit value, the corresponding position is set as the avoidance position at present. It is noted that there is a possibility that the avoidance position might be further adjusted in the following processing, and therefore, the avoidance position calculated at present is referred to as a provisional avoidance position.

Next, in step S5, the processor 13 determines, for the calculation result for the dummy camera 104 or the virtual camera employed as the provisional avoidance position, whether or not the rotation angle has reached the upper limit value. As a result, if the rotation angle has reached the upper limit value (YES in step S5), in step S6, the processor 13 calculates (searches for) a position that allows the line of sight from the provisional avoidance position to the player character 101 not to be blocked, in a direction approaching the player character 101 (i.e., the imaging direction). That is, the provisional avoidance position is pulled close to the player character 101 to calculate a final avoidance position. It is noted that an upper limit value is also set for the distance the provisional avoidance position can be pulled close to the player character 101. If the distance has reached the upper limit value, the position at this time is determined as a final avoidance position. On the other hand, when the rotation angle has reached the upper limit value, if the position at this time does not need to be pulled close to the player character 101, this position is determined as the avoidance position. That is, in this case, in step S6, the provisional avoidance position is not changed substantially, and this provisional avoidance position is just determined as the avoidance position.

On the other hand, if the rotation angle has not reached the upper limit value (NO in step S5), step S6 is skipped. Therefore, the provisional avoidance position is determined as the avoidance position.

Next, in step S7, the processor 13 performs movement control to gradually move the virtual camera 103 to the determined avoidance position as time elapses. In addition, at this time, the processor 13 also performs control to change the direction of the virtual camera 103 so as to keep the virtual camera 103 facing to the gaze point. That is, although the avoidance position is calculated one frame, the movement of the virtual camera 103 to the position is controlled so that the virtual camera 103 is gradually moved over several tens of frames, for example. For example, the distance between the avoidance position and the position of the virtual camera 103 at present may be calculated and a movement distance for one frame may be calculated so as to allow the virtual camera 103 to approach at a rate defined in advance. Then, if the position has already reached the avoidance position, the position is not moved any more.

In the movement (orientation) control for the virtual camera 103 to the avoidance position, particularly, in the case where the rotation angle has reached the upper limit value and therefore the control for pulling the virtual camera 103 is also performed (that is, step S6 is executed), either of the following controls may be used. Firstly, similarly to the order of the above determinations, the virtual camera 103 may be fully rotated up to the upper limit value of the rotation angle, and then pulled. Alternatively, the "rotation" and the "pull" may be simultaneously performed.

Next, in step S8, the processor 13 takes an image of the virtual game space by the virtual camera 103 and performs processing to render it as a game screen.

Next, processing to be performed when there is no camera in a collision state is present among the virtual camera 103 and the dummy camera 104 as a result of the determination in step S3 (NO in step S3) will be described. In this case, it is considered that the position of the virtual camera 103 does not need to be adjusted. In this case, first, in step S9, the processor 13 determines whether or not the player character 101 and the virtual camera 103 are in the reference positional relationship. This is to determine whether or not the position of the virtual camera 103 is adjusted at a position based on the avoidance position. That is, this is to determine whether or not the adjusted position of the virtual camera 103 needs to be returned to the original state. As a result of the determination, if they are not in the reference positional relationship (NO in step S9), in step S10, the processor 13 performs movement control to gradually move the position of the virtual camera 103 so that the virtual camera 103 returns to the reference positional relationship as time elapses. On the other hand, if they are in the reference positional relationship, step S10 is skipped. Thereafter, the process proceeds to step S8.

Regarding the movement (orientation) control for the virtual camera 103 in step S10, particularly, in the case where the rotation angle has reached the upper limit value and therefore the control of pulling the virtual camera 103 has been also performed, the pulled position of the virtual camera 103 may be returned to the position before the pulling operation, and then the returned position may be rotated, thereby returning the virtual camera 103 to the reference positional relationship. Alternatively, the "return of the pulled position" and the "rotation" may be simultaneously performed.

The description of the camera control processing according to the present embodiment is ended here.

As described above, in the present embodiment, for example, if there is an obstacle near the virtual camera 103, a position that allows the obstacle to be avoided is calculated in advance. Then, the virtual camera is gradually moved to the calculated position. Thus, the situation in which the player character 101 cannot be viewed because of contact between the virtual camera and the obstacle can be prevented, and the screen image can be progressed without strangeness.

In the above embodiment, the case where the dummy cameras 104 are placed on both sides of the virtual camera 103 and processing for moving the camera is performed, has been shown as an example. Instead, in another embodiment, in processing for every frame, the dummy cameras 104 may be placed on both sides of the virtual camera 103 to perform the above collision determination. That is, instead of placing the dummy cameras 104 in advance and moving the camera in processing for every frame, the dummy cameras may be newly placed every frame.

Figure 15:
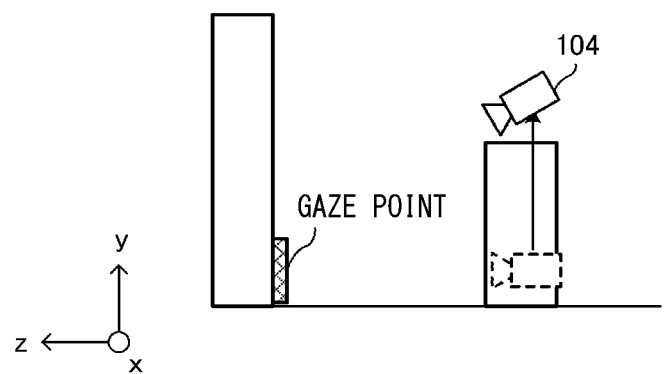
FIG. 15 is a diagram for explaining another example of virtual camera control.
Figure 16:
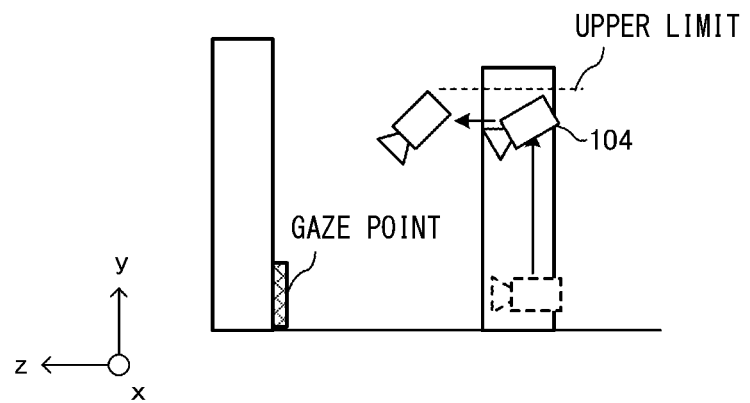
FIG. 16 is a diagram for explaining another example of virtual camera control.

In the above embodiment, as an example of a calculation method for the avoidance position when the dummy camera 104 contacts an obstacle, a method (see FIG. 12) of calculating the avoidance position by rotating the dummy camera 104 around the gaze point has been shown. Instead, in another embodiment, the avoidance position may be calculated by the following method. For example, the avoidance position may be calculated upward (in FIG. 12, the positive direction of the y axis) from the position of the dummy camera 104. That is, as shown in FIG. 15, the dummy camera 104 may be raised up (while keeping the gaze point) to calculate the height where the dummy camera 104 does not contact the obstacle. Further, when the avoidance position is thus calculated upward, if the line of sight from the calculated position is still blocked even after the calculated position has reached a predetermined upper limit position, as shown in FIG. 16, the avoidance position may be calculated in a direction approaching the gaze point while keeping the height.

In another embodiment, in the movement control for the virtual camera 103, a movement route to gradually reach the avoidance position may be calculated based on the avoidance position and the current position of the virtual camera 103, and the virtual camera 103 may be moved along the movement route.

Figure 17:
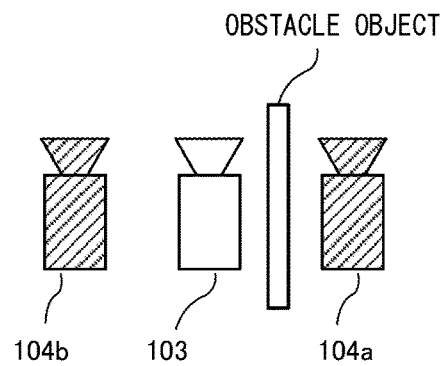
FIG. 17 is a diagram for explaining another example of virtual camera control.
Figure 18:
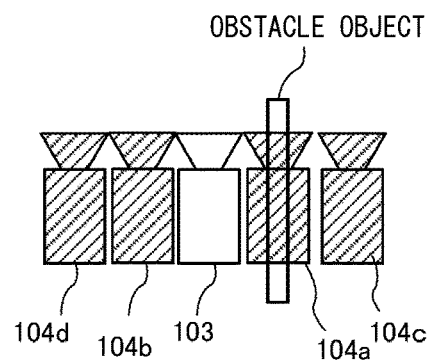
FIG. 18 is a diagram for explaining another example of virtual camera control.

In the above embodiment, the case where the dummy cameras are placed one by one on the right and the left of the virtual camera which can be in the travelling direction of the virtual camera, has been shown. In another embodiment, one dummy camera may be placed only in the travelling direction of the virtual camera. This travelling direction, that is, a direction designated by a player may be determined based on the operation data 202. In still another embodiment, three or more dummy cameras may be placed. For example, it is conceivable that as shown in FIG. 17, in the case where dummy cameras are placed one by one on the left and the right of the virtual camera, depending on the interval between the virtual camera and the dummy cameras, an obstacle such as a thin wall can be positioned in the gap so that the presence of the obstacle is overlooked. Therefore, as shown in FIG. 18, if a plurality of dummy cameras are placed on each of the left and the right of the virtual camera, the accuracy of detection of such an obstacle can be enhanced.

In the case of using a plurality of dummy cameras 104 (the case of placing them in front and back in the travelling direction of the virtual camera), the travelling direction (direction designated by a player) may be determined based on the operation data 202, and the above processing such as avoidance position calculation may be performed for only the dummy camera 104 on the travelling direction side.

In the above embodiment, the case where the interval between the dummy cameras 104 and the virtual camera 103 is a fixed interval set in advance, has been shown. In another embodiment, the interval may be broadened or narrowed in accordance with the player's operation, e.g., the magnitude (pressing time or the like) of a key input or the movement speed of the player character 101.

As a matter of course, in another embodiment, in the case where the travelling direction of the virtual camera is a depth direction (for example, a racing game), dummy cameras may be placed in front and back of the virtual camera, or in game processing in which the travelling direction is the up-down direction (for example, vertical scroll game), dummy cameras may be placed above and below the virtual camera along the travelling direction.

Figure 19:
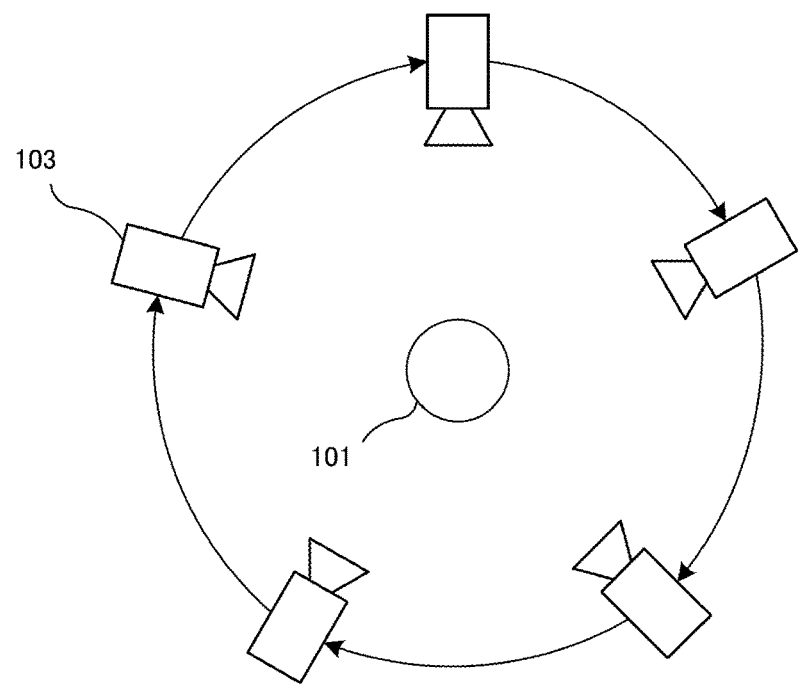
FIG. 19 is a diagram for explaining another example of virtual camera control.
Figure 20:
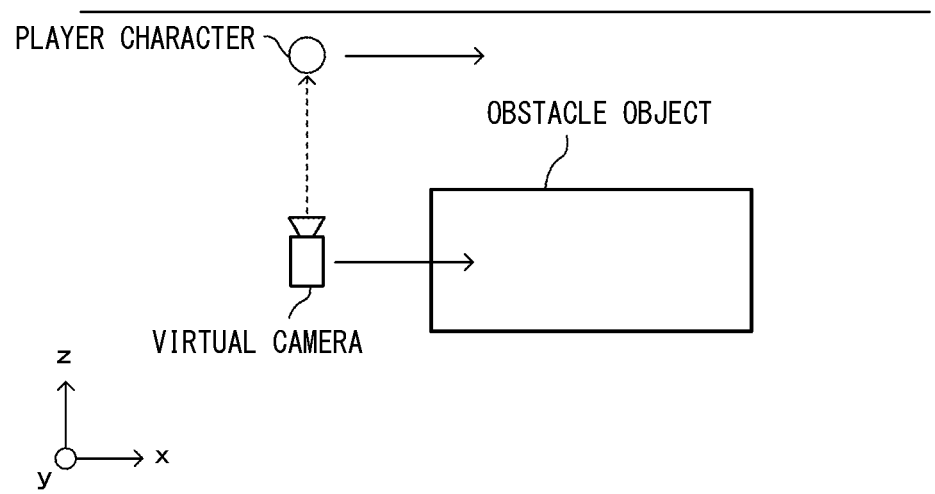
FIG. 20 is an exemplary diagram for explaining conventional virtual camera control.
Figure 21:
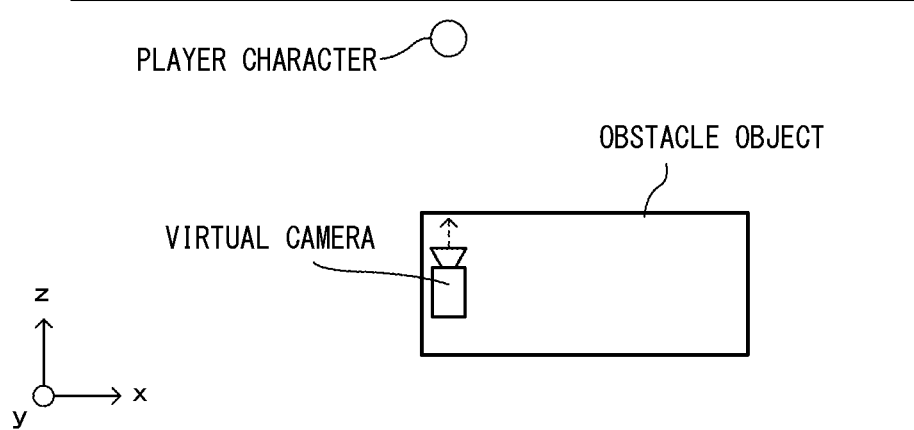
FIG. 21 is an exemplary diagram for explaining conventional virtual camera control.

In the above embodiment, as an example of the movement manner of the virtual camera, the case where the virtual camera 103 is moved along with movement (particularly, 2-dimensional movement) of the player character has been shown. Instead of such a movement manner, the processing as described in the above embodiment can be also applied to the case where, for example, as shown in FIG. 19, the virtual camera 103 is moved circularly around the player character 101. In this case, the virtual camera may be moved based on operation data according to an input from a player, or may be moved based on an orbit of the virtual camera defined in advance (for example, such definition may be utilized for movement of the virtual camera in an event scene interposed during a game). Besides, for general processing of camera movement control in which the subsequent movement route (travelling route) of the virtual camera 103 can be grasped, the above-described control using dummy cameras can be applied. In such a case, the placement position of a dummy camera is not limited to the left and the right of the virtual camera as described above, but the dummy cameras may be placed in any position around the virtual camera (360-degree range), e.g., above or below or in front or back of the virtual camera. Then, the travelling direction of the virtual camera may be determined based on operation data or the like, and whether or not the dummy camera present in the travelling direction is in a collision state as described above may be determined.

In another embodiment, processing as described above can be also applied to the case where a player operates the virtual camera 103 without moving the player character (for example, the case of performing an operation of changing the viewpoint).

In the above embodiment, the case where the direction (imaging direction) of the virtual camera 103 is directly used as the direction (imaging direction) of the dummy camera 104, has been shown as an example. Instead, in another embodiment, the direction of the dummy camera may also be directed to the player character 101. For example, both the gaze point of the virtual camera and the gaze point of the dummy camera 104 may be set at the position of the player character 101. Then, whether or not an object as an obstacle is present in an imaging range from the position of the dummy camera 104 to the player character 101 may be determined.

In the above embodiment, the collision determination has been performed for both the virtual camera and the dummy camera. In another embodiment, the collision determination may be performed only for the dummy camera.

In the above embodiment, application to game processing has been shown as an example. However, application is not limited thereto. The processing of the exemplary embodiments can be applied to general processing for moving a virtual camera in a virtual 3-dimensional space and displaying the taken image.

In the above embodiment, the case where a series of processing steps for performing movement control for the virtual camera so as to avoid collision with an obstacle are executed on a single apparatus, has been described. In another embodiment, the series of processing steps may be executed in an information processing system including a plurality of information processing apparatuses. For example, in an information processing system including a terminal apparatus and a server apparatus capable of communicating with the terminal apparatus via a network, some of the series of processing steps may be executed on the server apparatus. Alternatively, in an information processing system including a terminal apparatus and a server apparatus capable of communicating with the terminal apparatus via a network, primary part of the series of processing steps may be executed by the server apparatus, and other part of the series of processing steps may be executed by the terminal apparatus. In such an information processing system, a server-side system may be composed of a plurality of information processing apparatuses and processing to be executed on the server side may be divided and executed by the plurality of information processing apparatuses.

What is claimed is:

1. A computer-readable non-transitory storage medium having stored therein an information processing program which is executed by a computer of an information processing apparatus for displaying an image of a predetermined object capable of moving in a virtual space taken by a virtual camera following movement of the predetermined object, the information processing program causing the computer to provide functionality comprising:

a determination coordinate setting configured to determine a line extending through the virtual camera in a predetermined direction other than an imaging direction of the virtual camera and to set a first determination coordinate and a second determination coordinate at a predetermined distance along the line in front and behind the virtual camera with reference to a travelling direction of the virtual camera and to set the first determination coordinate on a predetermined travelling route of the virtual camera;

an obstacle determination configured to determine whether or not an obstacle object, which is an object other than the predetermined object, contacts a set determination coordinate or is present along a line parallel to the imaging direction of the virtual camera and extending from a set determination coordinate;

a calculation configured to calculate an avoidance position for the virtual camera, based on positions of the obstacle object and the predetermined object, from which an image taken by the virtual camera will include the predetermined object without the predetermined object being blocked by the obstacle object; and a detouring control configured to, when the obstacle determination has determined that the obstacle object contacts a set determination coordinate or is present along the line parallel to the imaging direction of the virtual camera, move the virtual camera along a path to the avoidance position as the virtual camera follows movement of the predetermined object;

a dummy camera placement configured to place a dummy camera at least at a position indicated by the first and/or second determination coordinate, the position being behind the virtual camera with reference to the travelling direction of the virtual camera, wherein an avoidance position for the dummy camera is calculated based on the positions of the obstacle object and the predetermined object, and a position of the virtual camera in a certain direction is set so that a coordinate of the virtual camera in the certain direction matches a coordinate of the dummy camera, in the certain direction, at the avoidance position of the dummy camera.

2. The computer-readable non-transitory storage medium having stored therein the information processing program according to claim 1, the information processing program further causing the computer to provide functionality further comprising: a virtual camera movement control configured to move the virtual camera, based on a predetermined condition.

3. The computer-readable non-transitory storage medium having stored therein the information processing program according to claim 2, wherein the virtual camera movement control moves the virtual camera, based on operation data indicating the content of operation by a player.

4. The computer-readable non-transitory storage medium having stored therein the information processing program according to claim 3, wherein the virtual camera movement control moves the virtual camera, based on movement of the predetermined object moved based on operation data indicating the content of operation by a player.

5. The computer-readable non-transitory storage medium having stored therein the information processing program according to claim 4, wherein a relative positional relationship between the predetermined object and the virtual camera is a positional relationship defined in advance.

6. The computer-readable non-transitory storage medium having stored therein the information processing program according to claim 1 wherein
the obstacle determination determines whether or not the obstacle object is present in an imaging direction of the dummy camera.

7. The computer-readable non-transitory storage medium having stored therein the information processing program according to claim 1, wherein the obstacle determination includes a determination of whether or not an obstacle object is present within an area existing between a line extending from the first or from the second determination coordinate to the predetermined object and a line extending from the virtual camera to the predetermined object.

8. The computer-readable non-transitory storage medium having stored therein the information processing program according to claim 1, wherein the obstacle determination includes a determination of whether or not the obstacle object is present in within a predetermined range extending from the virtual camera in a direction from the virtual camera to the predetermined object.

9. The computer-readable non-transitory storage medium having stored therein the information processing program according to claim 1, wherein the detouring control moves the virtual camera toward the avoidance position so that the obstacle object will not be present within the predetermined area.

10. The computer-readable non-transitory storage medium having stored therein the information processing program according to claim 1, wherein the detouring control moves the virtual camera so that the obstacle object will not be present along a line of sight between the virtual camera and the predetermined object, either by rotating the virtual camera around the predetermined object or by making the virtual camera approach the predetermined object.

11. The computer-readable non-transitory storage medium having stored therein the information processing program according to claim 1, wherein the detouring control moves the virtual camera at a rate which avoids sudden or abrupt changes in viewpoint.

12. The computer-readable non-transitory storage medium having stored therein an information processing program according to claim 1, wherein the determination coordinate setting is further configured to set the second determination coordinate in a direction which is opposite to the direction of the traveling route of the virtual camera.

13. The computer-readable non-transitory storage medium having stored therein an information processing program according to claim 1, wherein the first and second determination coordinates change positions along the travel direction when the virtual camera travels along the travel route.

14. The computer-readable non-transitory storage medium having stored therein an information processing program according to claim 1, wherein the determination coordinate setting sets the first determination coordinate on a predetermined travelling route of the virtual camera.

15. The computer-readable non-transitory storage medium having stored therein an information processing program according to claim 1, wherein the certain direction is the imaging direction of the virtual camera.

16. An information processing system for displaying an image of a predetermined object capable of moving in a virtual space taken by a virtual camera following movement of the predetermined object, the information processing system comprising:
at least one computer processor and a non-transitory storage medium storing instructions which upon execution by the at least one computer processor configure the information processing system to at least perform:
a determination coordinate setting for determining a line extending through the virtual camera in a predetermined direction other than an imaging direction of the virtual camera and setting a first determination coordinate and a second determination coordinate at a predetermined distance along the line in front and behind the virtual camera with reference to a travelling direction of the virtual camera and setting the first determination coordinate on a predetermined travelling route of the virtual camera;
an obstacle determination for determining whether or not an obstacle object, which is an object other than the predetermined object, contacts a set determination coordinate or is present along a line parallel to the imaging direction of the virtual camera and extending from a set determination coordinate;
a calculation for calculating an avoidance position for the virtual camera, based on positions of the obstacle object and the predetermined object, from which an image taken by the virtual camera will include the predetermined object without the predetermined object being blocked by the obstacle object; and
a detouring control for, when the obstacle determination has determined that the obstacle object contacts a set determination coordinate or is present along the line parallel to the imaging direction of the virtual camera, moving the virtual camera along a path to the avoidance position as the virtual camera follows movement of the predetermined object;
a dummy camera placement configured to place a dummy camera at least at a position indicated by the first and/or second determination coordinate, the position being behind the virtual camera with reference to the traveling direction of the virtual camera, wherein
an avoidance position for the dummy camera is calculated based on the positions of the obstacle object and the predetermined object, and
a position of the virtual camera in a certain direction is set so that a coordinate of the virtual camera in the certain direction matches a coordinate of the dummy camera, in the certain direction, at the avoidance position of the dummy camera.

17. The system according to claim 16, wherein the certain direction is the imaging direction of the virtual camera.

18. An information processing apparatus for displaying an image of a predetermined object in a virtual space taken by a virtual camera, the information processing apparatus comprising:
- a determination coordinate setting section configured to determine a line extending through the virtual camera in a predetermined direction other than an imaging direction of the virtual camera and to set a first determination coordinate and a second determination coordinate at a predetermined distance along the line in front and behind the virtual camera with reference to a travelling direction of the virtual camera and to set the first determination coordinate on a predetermined travelling route of the virtual camera;
- an obstacle determination section configured to determine whether or not an obstacle object, which is an object other than the predetermined object, contacts a set determination coordinate or is present along a line parallel to the imaging direction of the virtual camera and extending from a set determination coordinate;
- a calculating section configured to calculate an avoidance position for the virtual camera, based on positions of the obstacle object and the predetermined object, from which an image taken by the virtual camera will include the predetermined object without the predetermined object being blocked by the obstacle object; and
- a detouring section configured to, when the obstacle determination section has determined that the obstacle object contacts a set determination coordinate or is present along the line parallel to the imaging direction of the virtual camera, move the virtual camera along a path to the avoidance position as the virtual camera follows movement of the predetermined object;
- a dummy camera placement section configured to place a dummy camera at least at a position indicated by the first and/or second determination coordinate, the position being behind the virtual camera with reference to the traveling direction of the virtual camera, wherein
- an avoidance position for the dummy camera is calculated based on the positions of the obstacle object and the predetermined object, and
- a position of the virtual camera in a certain direction is set so that a coordinate of the virtual camera in the certain direction matches a coordinate of the dummy camera, in the certain direction, at the avoidance position of the dummy camera.

19. The apparatus according to claim 18, wherein the certain direction is the imaging direction of the virtual camera.

20. An information processing method for controlling an information processing apparatus or an information processing system for displaying an image of a predetermined object capable of moving in a virtual space taken by a virtual camera following movement of the predetermined object, the information processing method comprising:
- determining a line extending through the virtual camera in a predetermined direction other than an imaging direction of the virtual camera and setting a first determination coordinate and a second determination coordinate at a predetermined distance along the line in front and behind the virtual camera with reference to a travelling direction of the virtual camera and to set the first determination coordinate on a predetermined travelling route of the virtual camera;
- determining whether or not an obstacle object, which is an object other than the predetermined object, contacts a set determination coordinate or is present along a line parallel to the imaging direction of the virtual camera and extending from a set determination coordinate;
- calculating an avoidance position for the virtual camera, based on positions of the obstacle object and the predetermined object, from which an image taken by the virtual camera will include the predetermined object without the predetermined object being blocked by the obstacle object; and
- moving, when it is determined that the obstacle object has made contact or is present along the line parallel to the imaging direction of the virtual camera, the virtual camera along a path to the avoidance position as the virtual camera follows movement of the predetermined object;
- placing a dummy camera at least at a position indicated by the first and/or second determination coordinate, the position being behind the virtual camera with reference to the traveling direction of the virtual camera,
- calculating an avoidance position for the dummy camera based on the positions of the obstacle object and the predetermined object, and
- setting a position of the virtual camera in a certain direction so that a coordinate of the virtual camera in the certain direction matches a coordinate of the dummy camera, in the certain direction, at the avoidance position of the dummy camera.

21. The method according to claim 20, wherein the certain direction is the imaging direction of the virtual camera.

* * * * *